United States Patent
Akamatsu et al.

[11] Patent Number: 6,017,609
[45] Date of Patent: Jan. 25, 2000

[54] WATER-REPELLENT GLASS PLATE

[75] Inventors: Yoshinori Akamatsu; Seiji Yamazaki; Hiroaki Arai; Atsushi Takamatsu, all of Mie, Japan

[73] Assignee: Central Glass Company, Limited, Yamaguchi, Japan

[21] Appl. No.: 08/861,710

[22] Filed: May 22, 1997

[30] Foreign Application Priority Data

May 27, 1996 [JP] Japan ..................................... 8-131595

[51] Int. Cl.[7] ...................................................... B32B 5/00
[52] U.S. Cl. .......................... 428/141; 428/421; 428/422; 428/426; 428/432; 428/442; 428/163; 428/167; 427/290; 427/292; 427/314
[58] Field of Search ..................................... 428/421, 422, 428/141, 167, 426, 432, 442, 163; 427/290, 292, 314

[56] References Cited

U.S. PATENT DOCUMENTS

| | | | |
|---|---|---|---|
| 4,814,132 | 3/1989 | Aoki et al. | 264/165 |
| 5,166,000 | 11/1992 | Singh et al. | 428/428 |
| 5,324,566 | 6/1994 | Ogawa et al. | 428/141 |

FOREIGN PATENT DOCUMENTS

| | | |
|---|---|---|
| 0476510A1 | 3/1992 | European Pat. Off. . |
| 60-231442 | 11/1985 | Japan . |
| 3-205327 | 9/1991 | Japan . |
| 5-51238 | 3/1993 | Japan . |
| 6-279062 | 10/1994 | Japan . |

OTHER PUBLICATIONS

Patent Abstracts of Japan, vol. 017, No. 100 (C–1030) Feb. 26, 1993 & JP 04 288349 A (Matsushita Elec. Ind. Co Ltd), Oct. 13, 1992.

Database WPI, Derwent Publications Ltd., & JP 05024886 A (Nissan Motor Co Ltd), Feb. 2, 1993.

Patent Abstracts of Japan, vol. 095, No. 001, Feb. 28, 1995 and JP 06 279062 A (Nippon Sheet Glass Co Ltd), Oct. 4, 1994.

*Primary Examiner*—William P. Watkins, III
*Attorney, Agent, or Firm*—Evenson, McKeown, Edwards & Lenahan, P.L.L.C.

[57] ABSTRACT

The invention relates to a water-repellent glass plate. This glass plate has a glass substrate having a major surface and a water-repellent film formed on the major surface of the glass substrate. The water-repellent film is prepared by an application of a water-repellent agent which is in a liquid form, to the major surface of the glass substrate, while the glass substrate is heated at a temperature of from 90 to 200° C. The glass plate is superior in water repellency duration even under severe environment.

11 Claims, 2 Drawing Sheets

WATER-REPELLENT GLASS PLATE

BACKGROUND OF THE INVENTION

The present invention relates to glass plates each having thereon a water-repellent film. Such water-repellent glass plates can be used for various industrial uses (e.g., mirror), architectural windows, automotive windows, watercraft windows, and aircraft windows. The water-repellent film is required to have good weather resistance, good abrasion resistance, good scratch resistance, and good durability, as well as good water-repellency, for a long time. The water-repellent film is further required to have no defects such as cracks. The water-repellent film is still further required to be formed on a glass substrate in an easy, effective manner.

Hitherto, various water-repellent glass plates (panes) have been proposed. For example, Japanese Patent Unexamined Publication JP-A-60-231442 discloses a water-repellent film formed on a glass substrate. This film is made of a mixture of a first polymer for enhancing the attachment of the film to the glass substrate and a second polymer for imparting water repellency to the film. The proportion of the first polymer in the film gradually decrease from the glass substrate surface toward the outer surface of the film, and in contrast that of the second polymer therein gradually increase. The water-repellent film is formed thereon, for example, by plasma polymerization method. In this publication, the temperature of the glass substrate during the formation of the water-repellent film is not disclosed nor suggested at all.

JP-A-3-205327 discloses a method for producing a water-repellent glass plate. This method comprises a first step of applying a polysiloxane compound to a glass substrate and a second step of attaching the polysiloxane compound to the surface of the glass substrate by corona discharge or ultraviolet irradiation. The polysiloxane compound contains at least one group selected from —OR, —NH$_2$, —ON=C—R$_2$, and —O—COR where R is hydrogen or an alkyl group having a carbon atom number of from 1 to 4. In this publication, the temperature of the glass substrate during the first step is not specified at all.

JP-A-5-51238 discloses a water-repellent glass plate having a glass substrate and a water-repellent layer formed thereon. The water-repellent layer has a metal oxide phase and water-repellent fine particles (e.g., PTFE and BN) dispersed in the metal oxide phase. In this publication, the temperature of the glass substrate during the application of a coating liquid for forming the water-repellent layer is not specified at all.

JP-A-6-279062 discloses a water-repellent glass plate having a glass substrate, a silicon oxide coating layer formed on the glass substrate, and a water-repellent layer formed on the coating layer. The water-repellent layer is prepared by vacuum CVD method and is made of a fluorosilicone which is represented by the formula of $CF_3(CF_2)_p(CH_2)_mSiX_n(CH_3)_{3-n}$ where X is chlorine, $5 \leq p \leq 15$, $m=2$, and $1 \leq n \leq 3$. This fluorosilicone has at least one chlorine at its one end. It is preferable that the fluorosilicone layer of this publication is attached thereto by vacuum CVD method, while the glass substrate is heated, in order to accelerate its reaction with the surface of the glass substrate. It is stated in this publication that the heating temperature of the glass substrate varies depending on the kinds of the material of the glass substrate surface and on the kinds of water-repellent agent, and that a heating temperature of from 40 to 100° C. (e.g., about 80° C.) will suffice.

There is a demand for a water-repellent glass plate that has superior abrasion resistance for a long time.

SUMMARY OF THE INVENTION

It is therefore an object of the present invention to provide a water-repellent glass plate that has superior abrasion resistance for a long time.

It is a more specific object of the present invention to provide a glass plate having a water-repellent film that has superior abrasion resistance and thus exhibits superior water-repellency for a long time even under severe environment.

It is another object of the present invention to provide a method for producing such water-repellent glass plate.

According to the present invention, there is provided a water-repellent glass plate comprising a glass substrate having a major surface, and a water-repellent film formed on the major surface of the glass substrate. The water-repellent film is prepared by an application of a water-repellent agent which is in a liquid form, to the major surface of the glass substrate, while the glass substrate is heated at a temperature of from 90 to 200° C. Due to this heating, chemical bond between the water-repellent film and the glass substrate becomes substantially strong. Thus, a water-repellent glass plate according to the present invention has superior abrasion resistance and thus exhibits superior water-repellency for a long time even under severe environment. Furthermore, it has no defects such as cracks and can be prepared with easiness, stability, safety, and efficiency. According to the present invention, the water-repellent glass plate has an optional metal oxide film formed on the major surface of the glass substrate. In this optional case, the metal oxide film is interposed between the glass substrate and the water-repellent film.

According to the present invention, there is provided a method for producing a water-repellent glass plate having a glass substrate having a major surface. This method comprises a step of (a) forming a water-repellent film on the major surface of the glass substrate by applying a water-repellent agent which is in a liquid form, to the major surface of the glass substrate, while the glass substrate is heated at a temperature of from 90 to 200° C.

DESCRIPTION OF THE PREFERRED EMBODIMENTS

Figure 1:
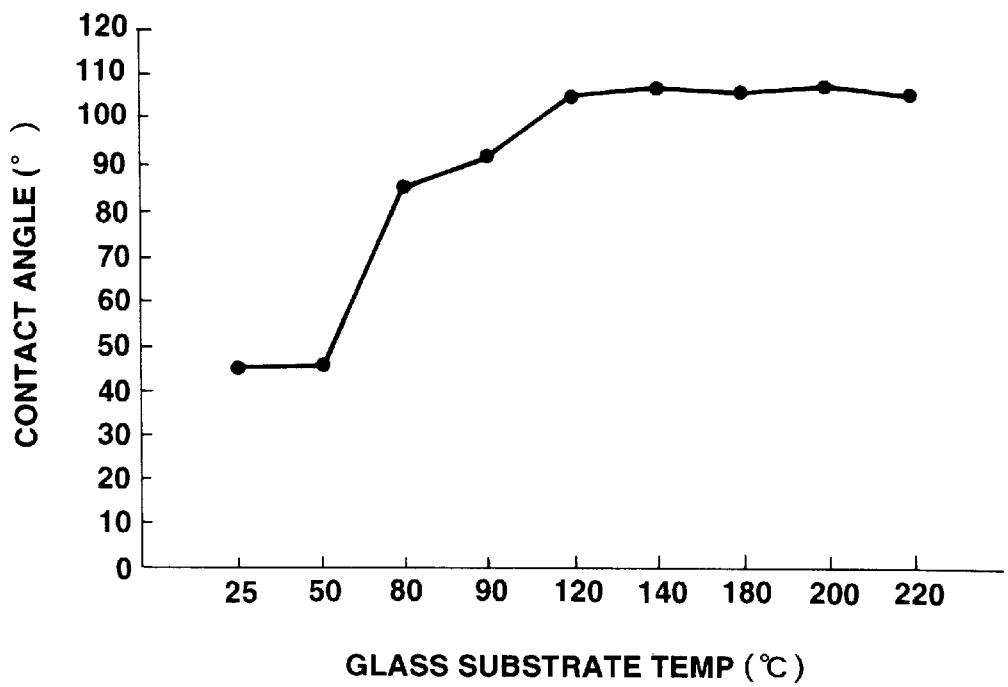
FIG. 1 is a graph showing the variation of the contact angle of water drop disposed on the water-repellent film which has been formed in accordance with Example 7b and then subjected to an abrasion resistance test of 3,500 reciprocations, with the heating temperature of the glass substrate at the time of the application of the water-repellent agent to the glass substrate.

As stated above, a water-repellent film of the present invention is prepared by applying a water-repellent agent which is in a liquid form, to the major surface of the glass substrate, while the glass substrate is heated at a temperature of from 90 to 200° C. If the heating temperature is lower than 90° C., chemical bond between the water-repellent film or the water-repellent agent and the glass substrate becomes insufficient. Therefore, the water-repellent glass plate becomes inferior in abrasion resistance. If the heating temperature is higher than 200° C., the solvent contained in the water-repellent agent evaporates substantially instantaneously. Therefore, a particularly large amount of the water-repellent agent is needed for the application to a glass substrate having a large surface area. This lowers the efficiency for producing the water-repellent glass plate. The heating temperature is preferably from about 100 to about 180° C., more preferably from about 110 to about 160° C. When the water-repellent agent is applied to the glass substrate, the glass substrate may be heated from ambient temperature to the above specified temperature. Alternatively, when the glass substrate has the above specified temperature during various treatments, such as heat tempering of the glass substrate, heat treatment for preparing a laminated glass plate, and the like, the water-repellent agent may be applied to the glass substrate. This application is preferably taken, because there is no need of heating only for the purpose of the application of the water-repellent agent thereto. With this, the production cost can be reduced.

In the invention, the glass substrate may be a soda-lime glass plate used for architectural window, mirror, aircraft window, watercraft window, automotive window, and the like. The glass substrate may be colorless or colored as long as it is transparent. Furthermore, the glass substrate may be a single glass plate, a laminated glass plate, a double glazing unit, or a tempered glass plate. In the invention, a functional thin film (e.g., metal oxide thin film) is optionally formed on the glass substrate. In this optional case, the functional thin film is interposed between the glass substrate and the water-repellent film. In the invention, the glass substrate may be replaced by another substrate made of at least one substance selected from plastics, ceramics other than glass, and the like.

In the invention, it is preferable to make the major surface of the glass substrate minutely rough by scratching an object against the major surface thereof. In case that the functional thin film is formed on the glass substrate, it is preferable to make the functional thin film minutely rough in the same manner as above. The object can be at least one selected from powders (e.g., ceria powder and alumina powder), abrasives, brushes, steel wools, and clothes (e.g., flannel). The scratching may be conducted by a dry or wet method. The minutely rough surface of the glass substrate has, for example, depressions (grooves) each having a depth of from about 10 to about 400 nm. It is preferable that the minutely rough surface has substantially linear stripes which are arranged in one direction. Herein, the linear stripes are referred to as substantially linear depressions (grooves) formed on the major surface of the glass substrate and as substantially linear land portions each being defined between two of the linear depressions.

In the invention, nonlimitative examples of the water-repellent compound used for the water-repellent agent are perfluoroalkylsilane compounds, such as $CF_3(CF_2)_nCH_2CH_2Si(OCH_3)_3$ where n is 3, 5 or 7, $CF_3(CF_2)_nCH_2CH_2SiCl_3$ where n is 3, 5 or 7, $CF_3(CF_2)_7CH_2CH_2SiCH_3Cl_2$, and $CF_3(CF_2)_7CH_2CH_2SiCH_3(OCH_3)_2$. The water-repellent agent may further contain solvent and catalyst, in addition to the water-repellent compound. This solvent may be at least one compound selected from lower alcohols each having a carbon atom number of up to 5 and ethers. The lower alcohols may be isopropyl alcohol, methanol, and ethanol. The catalyst of the water-repellent agent may be at least one acid catalyst selected from nitric acid, hydrochloric acid, sulfuric acid, and organic acids such as acetic acid. The catalyst concentration of the water-repellent agent is not particularly limited. The water-repellent agent can be prepared, for example, by mixing 1 part by weight of a perfluoroalkylsilane compound, 25 parts by weight of isopropyl alcohol, and 1 part by weight of 60% nitric acid, and then by stirring the mixture for at least about 1 hr at room temperature.

In the invention, the water-repellent agent may be applied to the glass substrate or the functional thin film by at least one of conventional methods, such as rubbing with cotton cloth, brushing, spraying, flow coating, spin coating, curtain flow coating, roller coating, and printing. It is preferable that the water-repellent film formed on the glass substrate or on the functional thin film is a monomolecular film having a thickness on the order of nanometers. It is preferable that the water-repellent film is chemically bonded to the major surface of glass substrate by siloxane bond. In the invention, it is optional to forcibly dry the water-repellent film by heating to evaporate the solvent.

As stated above, when the water-repellent agent is applied to the glass substrate or to the functional thin film formed thereon, the glass substrate is heated at a temperature of from 90 to 200° C. With this heating, there is obtained very strong chemical bond between the water-repellent film and the glass substrate or the functional thin film. For example, the water-repellent film is strongly bonded to silanol groups on the glass substrate surface, by the heating at the above specified temperature. Thus, the water-repellent film becomes superior in abrasion resistance and weather resistance, and therefore exhibits superior water-repellency for a long time even under severe environment.

The following nonlimitative examples are illustrative of the present invention.

EXAMPLE 1

At first, a water-repellent agent was prepared, as follows. One part by weight of a perfluoroalkylsilane compound, $CF_3(CF_2)_7CH_2CH_2Si(OCH_3)_3$ having a trade name of TSL8233 made by Toshiba Silicone Co., was mixed with 25 parts by weight of isopropyl alcohol (solvent) made by Kishida Chemical Co. and one part by weight of 60% nitric acid (catalyst) made by Kishida Chemical Co. The resultant mixture was stirred at room temperature for about 1 hr, thereby to prepare the water-repellent agent in the form of liquid.

Separately, a float glass substrate having a width of about 100 mm, a length of about 200 mm and a thickness of about 3.5 mm was abraded with ceria powder, then washed with tap water, and then rinsed with distilled water. The thus treated glass substrate was allowed to stand still for 40 min in a dryer heated at about 150° C. When the temperature of the glass substrate reached to about 130° C., it was taken out quickly from the dryer. Immediately after that, the water-repellent agent was applied to the glass substrate with a commercial brush. About 1 min later, an excessive amount of the water-repellent agent was removed by a commercial paper wiper, KIM TOWEL (trade name), thereby to prepare a water-repellent glass plate (i.e., a test piece having dimensions of 100 mm and 200 mm).

Figure 2:
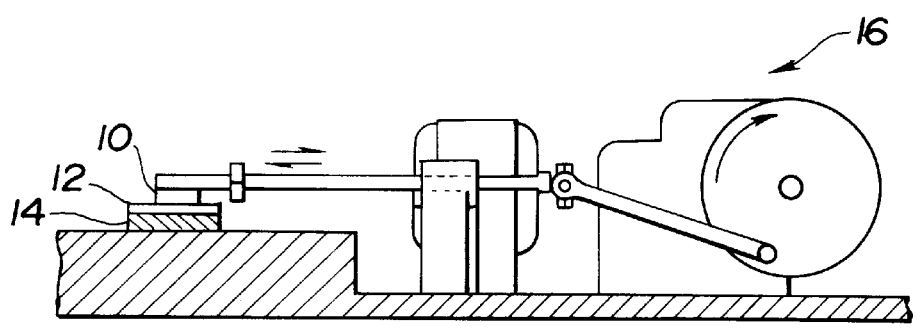
FIG. 2 is an elevational side view of a traverse-type abrasion resistance tester.

The test piece was found to have no defects such as cracks. It was subjected to an abrasion resistance test. In this test, as shown in FIG. 2, a piece of canvas 10 was slidingly moved on the water-repellent film 12 formed on the glass substrate 14, in a manner to traverse the test piece, using a traverse-type abrasion resistance tester 16, with a stroke of 100 mm, at a rate of 30 reciprocations per minute. In this test, a load of 0.1 $kg/cm^2$ was added to the piece of canvas, in accordance with Japanese Industrial Standard (JIS) L 3102-1961-1206, of which disclosure is incorporated herein by reference in its entirety. The contact angle of water drop (2 μl of pure water) disposed on the water-repellent film was measured by the CA-A type contact angle tester made by Kyowa Kaimen Kagaku Co. in the atmosphere at about 25° C., before the test, and after 1,000, 2,000 and 3,500 reciprocations of the piece of canvas. The results are shown in Table. In this test, a contact angle of at least about 95 degrees (preferably at least about 100 degrees) after 3,500 reciprocations was judged as being satisfactory, with respect to abrasion resistance of the water-repellent film.

TABLE

|  | Contact Angle before Abrasion Res. Test (°) | Contact Angle after Abrasion Resistance Test (°) | | |
|---|---|---|---|---|
|  |  | 1,000 reciprocations | 2,000 reciprocations | 3,500 reciprocations |
| Example 1 | 110 | 108 | 108 | 106 |
| Example 2 | 110 | 107 | 105 | 103 |
| Example 3 | 109 | 107 | 106 | 104 |
| Example 4 | 110 | 108 | 107 | 107 |
| Example 5 | 111 | 109 | 108 | 107 |
| Example 6 | 109 | 108 | 108 | 107 |
| Example 7a | 110 | 107 | 107 | 104 |
| Example 8 | 111 | 110 | 109 | 108 |
| Com. Ex. 1 | 107 | 85 | 77 | 57 |
| Com. Ex. 2 | 110 | 90 | 55 | 46 |
| Com. Ex. 3 | 117 | 65 | 45 | 28 |
| Com. Ex. 4 | 111 | 89 | 78 | 69 |

In addition to the contact angle of water drop, the angle of inclination of the test piece to make water drop of 45 μl start falling down thereon was measured, before the abrasion resistance test, and after 3,500 reciprocations. As to the angle of inclination, an angle of up to about 40 degrees after 3,500 reciprocations was judged as being satisfactory. It was found that the difference between the angles of inclination before the test and after 3,500 reciprocations was small. This means that water repellency of the test piece did not decrease so much by the abrasion resistance test.

The test piece was further subjected to an accelerated weathering test. This test was conducted for about 800 hr at about 35° C., in a relative humidity of about 50%, by intermittently irradiating the test piece with super ultraviolet rays for about 150 hr, with a distance of about 25 mm between a super ultraviolet lamp and the surface of the test piece, with an irradiation power per unit area of the test piece of about 75 mW/cm$^2$. Before and after the weathering test, the contact angle of water drop on the test piece and the angle of inclination of the test piece were respectively measured in the same ways as above. The contact angle and the angle of inclination were found as being respectively satisfactorily high and low, even after the weathering test.

It was tried to measure thickness of the water-repellent film of the test piece by an analytical equipment, DEKTAK 3030 (trade name) of Sloan Co. It was difficult, however, to conduct the measurement, because thickness of the water-repellent film was up to a thickness of from about 10 to about 15 nm. Therefore, the water-repellent film was judged to be a monomolecular film.

The test sample was further subjected to other conventional evaluation tests required for evaluating various coating films formed on glass articles and various glass articles themselves, such as architectural, industrial and automotive windows. The results of these evaluation tests were satisfactory.

EXAMPLE 2

In this example, Example 1 was repeated except in that temperature of the glass substrate at the time of the application of the water-repellent agent thereto was about 90° C., in place of about 130° C. The water-repellent film formed on the glass substrate had no defects such as cracks and was a monomolecular film. The results of the measurement of the contact angle of water drop before and after the abrasion resistance test are shown in Table, and the results of the other evaluation tests were satisfactory as in Example 1.

EXAMPLE 3

In this example, Example 1 was repeated except in that temperature of the glass substrate at the time of the application of the water-repellent agent thereto was about 140° C., in place of about 130° C. The water-repellent film formed on the glass substrate had no defects such as cracks and was a monomolecular film. The results of the measurement of the contact angle of water drop before and after the abrasion resistance test are shown in Table, and the results of the other evaluation tests were satisfactory as in Example 1.

EXAMPLE 4

In this example, Example 1 was repeated except in that $CF_3(CF_2)_7CH_2CH_2SiCl_3$ was used as a perfluoroalkylsilane compound of the water-repellent agent, in place of $CF_3(CF_2)_7CH_2CH_2Si(OCH_3)_3$. The water-repellent film formed on the glass substrate had no defects such as cracks and was a monomolecular film. The results of the measurement of the contact angle of water drop before and after the abrasion resistance test are shown in Table, and the results of the other evaluation tests were satisfactory as in Example 1.

EXAMPLE 5

In this example, Example 1 was repeated except in that $CF_3(CF_2)_7CH_2CH_2SiCH_3(OCH_3)_2$ was used as a perfluoroalkylsilane compound of the water-repellent agent, in place of $CF_3(CF_2)_7CH_2CH_2Si(OCH_3)_3$. The water-repellent film formed on the glass substrate had no defects such as cracks and was a monomolecular film. The results of the measurement of the contact angle of water drop before and after the abrasion resistance test are shown in Table, and the results of the other evaluation tests were satisfactory as in Example 1.

EXAMPLE 6

In this example, Example 1 was repeated except in that the water-repellent film formed by the application of the water-repellent agent with a brush was dried at about 100° C. for about 30 min. The water-repellent film formed on the glass substrate had no defects such as cracks and was a monomolecular film. The results of the measurement of the contact angle of water drop before and after the abrasion resistance test are shown in Table, and the results of the other evaluation tests were satisfactory as in Example 1.

EXAMPLE 7a

In this example, Example 1 was repeated except in that 0.1 N nitric acid aqueous solution was used in the preparation of the water-repellent agent. The water-repellent film formed on the glass substrate had no defects such as cracks and was a monomolecular film. The results of the measurement of the contact angle of water drop before and after the abrasion resistance test are shown in Table, and the results of the other evaluation tests were satisfactory as in Example 1.

EXAMPLE 7b

In this example, the water-repellent glass plates (test pieces) were prepared in accordance with Example 7a except in that the temperature of the glass substrate at the time of the application of the water-repellent agent was varied from about 25 to about 220° C. as shown in FIG. 1, in place of about 130° C. Then, each test piece was subjected to the abrasion resistance test of 3,500 reciprocations in the same manner as that of Example 1. The results of the measurement of the contact angle after this abrasion resistance test are shown in FIG. 1.

EXAMPLE 8

In this example, the water-repellent glass plate was prepared as follows. At first, a float glass substrate which is the same as that of Example 1 was abraded by using an alumina powder having an average particle diameter of about 5 $\mu$m and a brush, in a manner to form thereon scratches which are arranged in one direction to traverse the glass substrate. Then, the glass substrate was washed in the same manner as that of Example 1.

Figure 3:
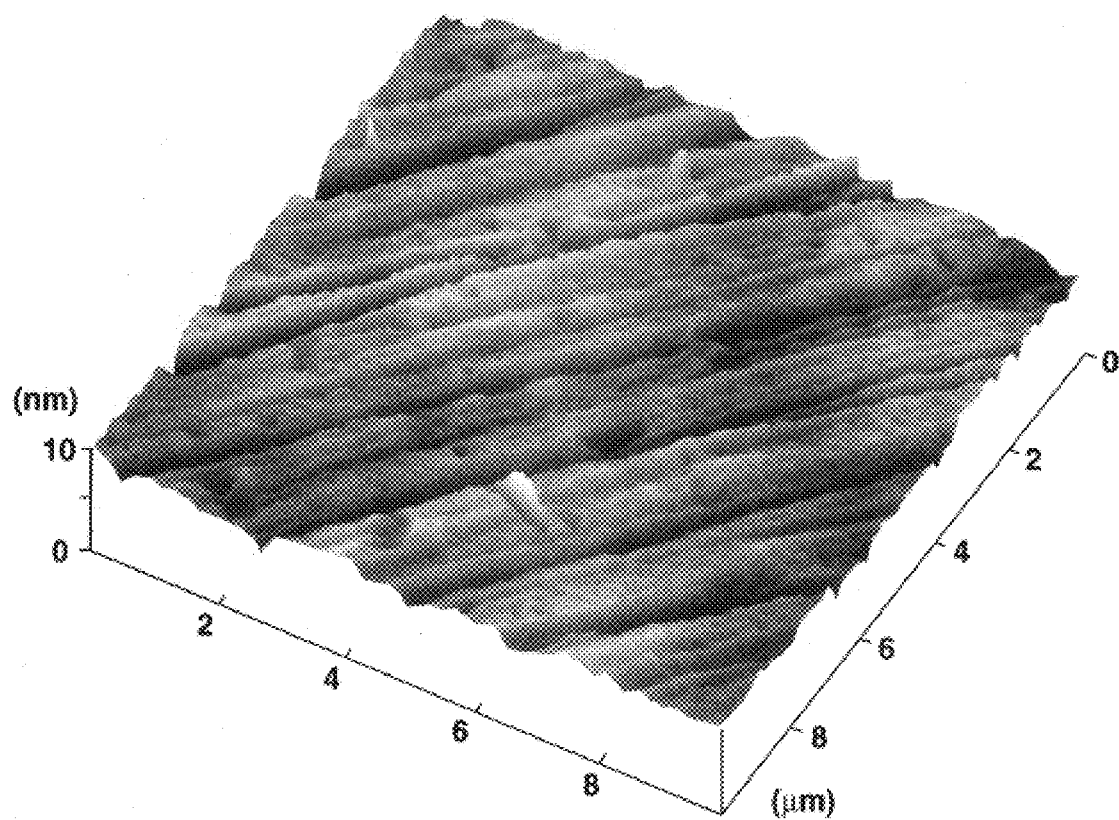
FIG. 3 is a photograph taken by AFM, showing the minutely rough surface of the glass substrate according to Example 8.

Then, the surface of the glass substrate was observed by using an atomic force microscope (AFM) mode of a scanning probe microscope, SP13700 (trade name) of Seiko Denshi Co., with 5 $\mu$m square scanning, and its photograph is shown in FIG. 3. As shown in FIG. 3, it was found that the glass substrate surface was minutely rough and had substantially linear depressions (grooves) each having a depth of from about 10 to about 400 nm. Furthermore, it was found that the glass substrate surface had substantially linear land portions each being defined by two of the linear depressions and that these depressions and land portions were substantially arranged in one direction. The center line average roughness (Ra), which is defined in JIS B 0601, of the glass substrate surface observed with this microscope was found to be from about 3 to about 6 nm.

Then, the glass substrate was allowed to stand still in a dryer heated at about 150° C., for about 20 min. When the glass substrate reached to a temperature of from 120 to 130° C., it was quickly taken out therefrom. Immediately after that, the water-repellent agent of Example 1 was applied to the glass substrate by using a commercial brush. About one minute later, an excessive amount of the water-repellent agent was removed in the same manner as that of Example 1, thereby to form a water-repellent film on the glass substrate.

The water-repellent film had no defects such as cracks and was a monomolecular film. The results of the measurement of the contact angle of water drop before and after the abrasion resistance test are shown in Table, and the results of the other evaluation tests were satisfactory as in Example 1.

Comparative Example 1

At first, a float glass substrate having a width of about 100 mm, a length of about 200 mm and a thickness of about 3.5 mm was washed by using a commercial automatic washer for glass substrates, WM-350H (trade name) of Bando Kiko Co. Then, the water-repellent agent was applied to the glass substrate at room temperature, about 25° C., thereby to prepare a water-repellent glass plate. In other words, the temperature of the glass substrate was about 25° C. at the time of the application. Then, the water-repellent glass plate was subjected to the same evaluation tests as those of Example 1. As shown in Table, the test piece was found to be inferior in water repellency duration under a severe environment (i.e., the abrasion resistance test).

Comparative Example 2

In this comparative example, Comparative Example 1 was repeated except in that the water-repellent film was dried at about 140° C. for about 30 min after the application of the water-repellent agent. As shown in Table, the test piece was found to be inferior in water repellency duration under the severe environment.

Comparative Example 3

At first, a float glass substrate was coated with a first aqueous solution prepared by hydrolyzing tetraethoxysilane, by dip coating method. Then, the coated glass substrate was dried at about 270° C. for about 10 min and then baked at about 620° C. for about 10 min, thereby to form a $SiO_2$ film on the glass substrate. This film was found to be about 150 nm in thickness. Then, a second aqueous solution prepared by partially hydrolyzing heptadecatridecylfluoroalkylsilane $CF_3(CF_2)_7CH_2CH_2Si(OCH_3)_2$ was applied to the $SiO_2$ film to form a water-repellent film on the $SiO_2$ film. Then, the thus coated glass substrate was heated at about 140° C. for about 30 min, thereby to prepare a water-repellent glass plate. This glass plate (test piece) was subjected to the same evaluation tests as those of Example 1. As shown in Table, the test piece was found to be inferior in water repellency duration under the severe environment.

Comparative Example 4

In this comparative example, Example 1 was repeated except in that the temperature of the glass substrate was about 50° C. at the time of the application of the water-repellent agent. As shown in Table, the test piece was found to be inferior in water repellency duration under the severe environment.

The entire disclosure of Japanese Patent Application No. 8-131595 filed on May 27, 1996 including specification, claims and summary is incorporated herein by reference in its entirety.

What is claimed is:

1. A water-repellent glass plate comprising:
   a glass substrate having a major surface; and
   a water-repellent film formed on said major surface of said glass substrate, said water-repellent film being prepared by an application of a water-repellent agent, which is in a liquid form, to said major surface of said glass substrate while said glass substrate is heated at a temperature of from 90 to 200° C.;

said major surface of said glass substrate being a minutely rough surface formed by scratching ceria powder and/or alumina powder against said major surface;

wherein said minutely rough surface has substantially linear stripes which are arranged in one direction.

2. A glass plate according to claim 1, wherein said linear stripes are substantially linear depressions formed on said major surface of said glass substrate.

3. A glass plate according to claim 1, wherein said linear stripes are substantially linear land portions each being defined between two of said linear depressions.

4. A glass plate according to claim 1, wherein said water-repellent agent contains at least one perfluoroalkylsilane compound selected from the group consisting of $CF_3(CF_2)_nCH_2CH_2Si(OCH_3)_3$ where n is 3, 5 or 7, $CF_3(CF_2)_nCH_2CH_2SiCl_3$ where n is 3, 5 or 7, $CF_3(CF_2)_7CH_2CH_2SiCH_3Cl_2$, and $CF_3(CF_2)_7CH_2CH_2SiCH_3(OCH_3)_2$.

5. A glass plate according to claim 4, wherein said water-repellent agent further contains a solvent, a catalyst and water.

6. A glass plate according to claim 5, wherein said solvent is at least one compound selected from the group consisting of alcohols each having a carbon atom number of up to 5 and ethers.

7. A glass plate according to claim 6, wherein said alcohols are isopropyl alcohol, methanol, and ethanol.

8. A glass plate according to claim 5, wherein said catalyst is at least one selected from the group consisting of nitric acid, hydrochloric acid, sulfuric acid, and acetic acid.

9. A glass plate according to claim 1, wherein said water-repellent film is a monomolecular film.

10. A water-repellent glass plate comprising:

a glass substrate having a major surface;

a metal oxide film formed on said major surface of said glass substrate; and a water-repellent film formed on said metal oxide film, said water-repellent film being prepared by an application of a water-repellent agent, which is in a liquid form, to said metal oxide film while said metal oxide film is heated at a temperature of from 90 to 200° C.;

said metal oxide film having a minutely rough surface formed by scratching ceria powder and/or alumina powder against said metal oxide film;

wherein said minutely rough surface has substantially linear stripes which are arranged in one direction.

11. A method for producing a water-repellent glass plate comprising:

providing a glass substrate having a major surface, making said major surface of said glass substrate a minutely rough surface by scratching ceria powder and/or alumina powder against said major surface, said minutely rough surface having substantially linear strives which are arranged in one direction, forming a water-repellent film on said major surface of said glass substrate by applying a water-repellent agent, which is in a liquid form, to said major surface of said glass substrate, and heating said glass substrate at a temperature of from 90 to 200° C. while forming the water-repellent film.

* * * * *